(12) United States Patent
Guttenberg et al.

(10) Patent No.: US 9,796,135 B2
(45) Date of Patent: Oct. 24, 2017

(54) BELT SPLICER

(71) Applicant: Laitram, L.L.C., Harahan, LA (US)

(72) Inventors: Robert G. Guttenberg, Jefferson, LA (US); Gabriel Nazar, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 84 days.

(21) Appl. No.: 14/825,868

(22) Filed: Aug. 13, 2015

(65) Prior Publication Data
US 2017/0043524 A1    Feb. 16, 2017

(51) Int. Cl.
| | |
|---|---|
| *B29C 65/02* | (2006.01) |
| *B29C 65/18* | (2006.01) |
| *B29C 65/20* | (2006.01) |
| *B29C 65/00* | (2006.01) |
| *F16G 3/00* | (2006.01) |
| *F16G 3/10* | (2006.01) |
| *F16G 3/16* | (2006.01) |
| *B29L 31/00* | (2006.01) |
| *B29C 65/30* | (2006.01) |

(52) U.S. Cl.
CPC ...... *B29C 65/2076* (2013.01); *B29C 66/1142* (2013.01); *B29C 66/4324* (2013.01); *B29C 66/73921* (2013.01); *B29C 66/8222* (2013.01); *B29C 66/8225* (2013.01); *B29C 66/8227* (2013.01); *B29C 66/83221* (2013.01); *B29C 66/855* (2013.01); *F16G 3/003* (2013.01); *F16G 3/006* (2013.01); *F16G 3/10* (2013.01); *F16G 3/16* (2013.01); *B29C 65/305* (2013.01); *B29C 66/14* (2013.01); *B29L 2031/7092* (2013.01)

(58) Field of Classification Search
CPC .............. B29C 66/4324; B29C 66/855; B29C 66/8225; B29C 66/8227; B29C 65/2076
See application file for complete search history.

(56) References Cited

U.S. PATENT DOCUMENTS

| | | | |
|---|---|---|---|
| 2,956,615 | A | 10/1960 | Hasselquist |
| 4,082,592 | A | 4/1978 | Raabe et al. |
| 4,716,811 | A | 1/1988 | Johnson |
| 4,765,862 | A | 8/1988 | Azuma |
| 4,867,835 | A | 9/1989 | Poole |

(Continued)

FOREIGN PATENT DOCUMENTS

| | | |
|---|---|---|
| DE | 102005034220 A1 | 1/2007 |
| GB | 438845 A | 11/1935 |
| JP | 5159980 A | 5/1976 |

OTHER PUBLICATIONS

Written Opinion of the International Searching Authority, PCT/US2016/042119, dated Oct. 20, 2016, Korean Intellectual Property Office.

(Continued)

*Primary Examiner* — Mark A Osele
(74) *Attorney, Agent, or Firm* — James T. Cronvich

(57) ABSTRACT

A belt splicer for splicing butt ends of thermoplastic belts together. The splicer uses a plurality of cranks in conjunction with heavy springs to close and rapidly open jaws holding butt ends of a belt in place against a heating wand for melting and against each other for welding the melted ends together. The rapid opening of the jaw also lowers the wand, which is locked in place by a wand lock during the melting of the butt ends.

16 Claims, 6 Drawing Sheets

(56) References Cited

U.S. PATENT DOCUMENTS

| | | | |
|---|---|---|---|
| 5,104,102 | A | 4/1992 | Buxton |
| 5,118,024 | A | 6/1992 | McClure |
| 5,690,776 | A | 11/1997 | Anderson |
| 5,954,320 | A | 9/1999 | Bohler |
| 6,375,770 | B1 | 4/2002 | Meltzer et al. |
| 6,893,531 | B1 | 5/2005 | Todaro et al. |
| 7,331,093 | B2 | 2/2008 | Ferrari |
| 8,132,489 | B2 | 3/2012 | Zieger |
| 8,596,622 | B2 * | 12/2013 | Guttenberg ......... B29C 66/0042 269/32 |
| 8,770,253 | B2 | 7/2014 | Zieger |
| 2004/0118513 | A1 | 6/2004 | Dyrlund et al. |
| 2009/0223023 | A1 | 9/2009 | Daniels et al. |
| 2010/0013137 | A1 | 1/2010 | Weller |
| 2011/0067801 | A1 | 3/2011 | van 't Schip |
| 2011/0089620 | A1 | 4/2011 | Guttenberg |
| 2013/0247515 | A1 | 9/2013 | Actis |
| 2014/0182782 | A1 | 7/2014 | Zieger et al. |

OTHER PUBLICATIONS

"ThermoDrive Splicing System" brochure, MOL Industries, Grand Rapids, MI, U.S.A., first published Sep. 2006.

\* cited by examiner

BELT SPLICER

BACKGROUND

The invention relates to splicing tools for thermally joining the butt edges of plastic conveyor belts.

Splicing presses are used to weld the butt ends of two thermoplastic conveyor belt sections together. Conventional presses include a pair of clamps, each of which holds one of the two belt sections. The clamps firmly hold the belt sections with the butt ends facing each other across a gap. A heating wand is moved into the gap, and the two clamps close until the butt ends of the belt sections contact opposite sides of the heating wand. As soon as the butt ends are softened or melted sufficiently by the wand's heat, the clamps are retracted and the wand moved out of the way. Then the clamps are moved toward each other until the softened or melted butt ends meet. The clamps hold the butt ends together as the joint at their interface cools. A splicer that is especially useful with thermoplastic materials, such as polyester, that tend to stick to the sides of the wand when the clamps are retracted is disclosed in U.S. Pat. No. 8,596,622, Dec. 3, 2013, to Robert G. Guttenberg. Although that splicer has a rapid release of the butt ends from the heating wand, the wand has to be manually inserted and removed.

SUMMARY

One version of a belt splicer embodying features of the invention comprises a first jaw and a confronting second jaw supporting belt butt ends to be spliced together. A first jaw opener is connected to the first jaw, and a second jaw opener is connected to the second jaw. Each of the first and second jaws includes a spring mechanism connected to one of the first and second jaws and having a spring and a crank mechanism having a crank coupled to the spring mechanism to compress and release the spring and to move the one of the first and second jaws toward the other of the first and second jaws. The release of the spring thrusts the one of the first and second jaws away from the other of the first and second jaws. A master shaft connected to the crank mechanism of the first jaw opener turns the crank. A slave shaft is coupled to the master shaft to rotate together in synchronism. The slave shaft is connected to the crank mechanism of the second jaw opener to turn its crank in synchronism with the crank of the first jaw opener so that the first and second jaws are closed together and so that the compressed springs of the first and second jaw openers are released simultaneously to thrust the first and second jaws open.

A second version of a belt splicer embodying features of the invention comprises a first jaw and a confronting second jaw supporting belt butt ends to be spliced together. A first jaw opener is connected to the first jaw, and a second jaw opener is connected to the second jaw. Each of the first and second jaw openers includes a spring mechanism connected to one of the first and second jaws and having a spring and a crank mechanism having a crank coupled to the spring mechanism to compress and release the spring and to move the one of the first and second jaws toward the other of the first and second jaws. The release of the spring thrusts the one of the first and second jaws away from the other of the first and second jaws. A shaft coupled to the crank mechanisms of the first and second jaw openers turns their cranks. The belt splicer further comprises a heating wand and a wand positioner that includes a wand lock that locks the heating wand in a raised position between the confronting first and second jaws for melting butt ends of a belt and that is engaged by a cam on the shaft when the jaws are thrust open to lower the heating wand to a lowered position below the first and second jaws.

Yet another version of a belt splicer embodying features of the invention comprises a first jaw and a confronting second jaw supporting belt butt ends to be spliced together. A first jaw opener is connected to the first jaw, and a second jaw opener connected to the second jaw. Each of the first and second jaw openers includes a spring mechanism connected to one of the first and second jaws and having a spring and a crank mechanism having a crank and a connecting arm, which is pivotally connected at a first end to the crank and at an opposite second end to the spring mechanism to compress the spring. The crank further includes a roller and a track along which the roller rolls as the crank is rotated in a first direction to compress the spring toward a critical position at which the spring is compressed greatest. When the crank is rotated in the first direction past the critical position, spring pressure from the compressed spring rotates the crank, which forces the roller, at an end of the track, against the connecting arm to stop the crank from further rotation in the first direction.

DETAILED DESCRIPTION

Figure 1:
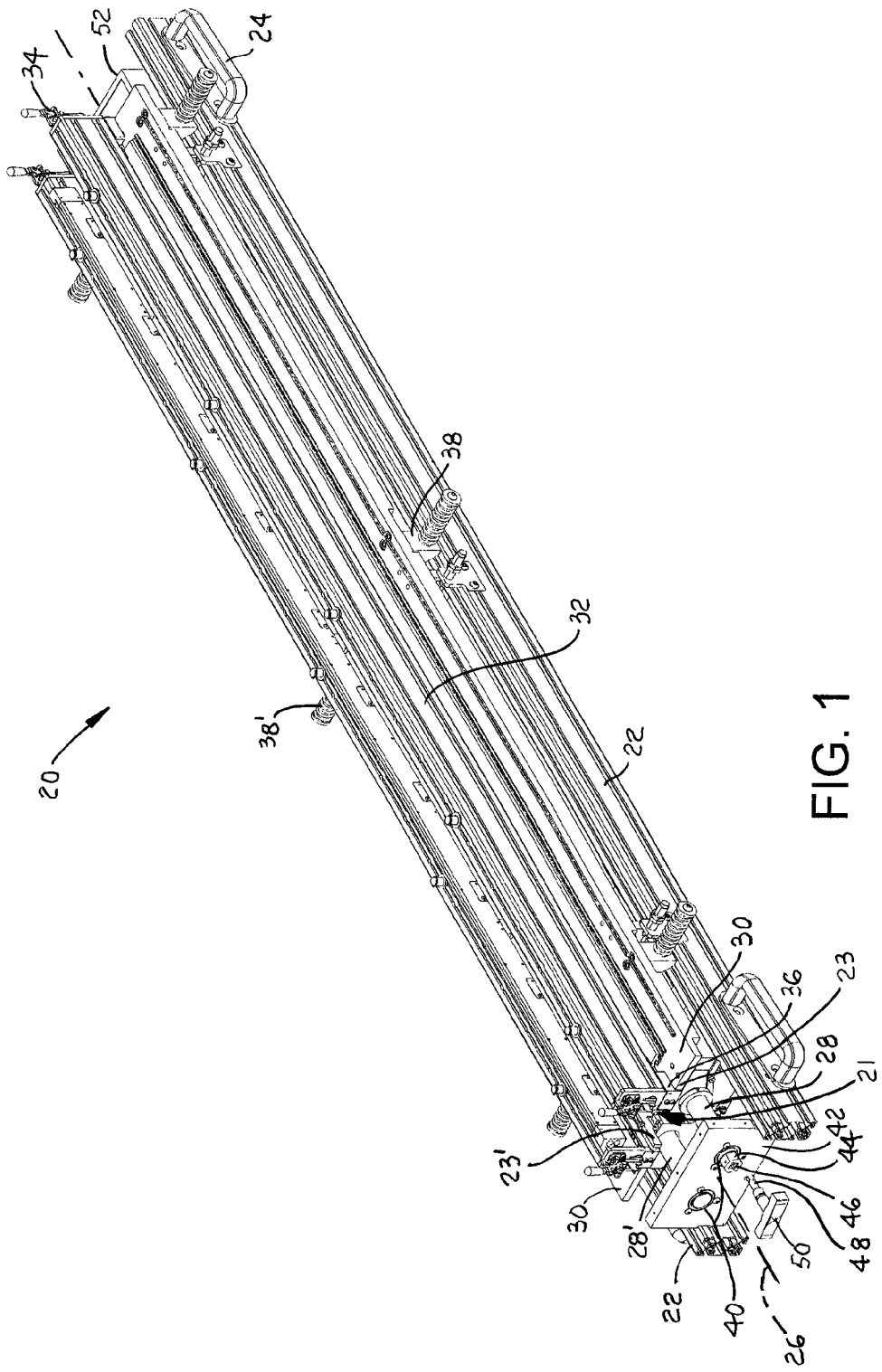
FIG. 1 is an isometric view of a belt splicer embodying features of the invention.

A belt splicer embodying features of the invention is shown in FIG. 1. The splicer 20 comprises a wand positioner and jaws 21 supported between a pair of frame rails 22. Handles 24 attached to the frame 22 at each end aid in the splicer's portability. The jaws 21 are divided into a right jaw 23 and a left jaw 23', each an almost identical mirror image of the other about a vertical plane through the splicer's axial centerline 26. Each half 23, 23' of the jaws 21 comprises a shaft 28, 28' extending parallel to the centerline 26 in the width direction of the splicer. The rotation of the shaft opens and closes the jaws 21. Each jaw 23, 23' also has an upper deck 30 on which sit two belt end sections to be spliced together. The belt end sections may be opposite ends of a single belt or ends of individual belt sections to be spliced together. Rotation of the shafts 28, 28' translates the left and right jaws 23, 23' toward and away from each other between closed and open positions. A top clamp 32 for each jaw 23, 23' extends along the width of the splicer 20 across a gap from the upper deck 30. The clamp 32 has locking elements 34 at each end to releasably clamp the butt end of a belt section between itself and the deck 30. The ends of the clamps 32 sit atop clamp blocks 36 mounted to the deck 30. Each jaw 23, 23' also includes pairs of reclosable jaw openers 38, 38' at spaced locations along the width of the splicer 20. In this example the reclosable jaw openers 38, 38' are located at each axial end of the splicer and the third ones midway between the other two. But more than three openers could be used for a wider belt splicer. The pairs of jaw openers 38, 38' close and reopen the jaws 21 by translating the opposing jaws 23, 23' toward and away from each other. The main difference between the left and right jaws 23, 23' is that the shaft on one half is a master shaft 28, while the other is a slave shaft 28' geared to the master shaft.

Both shafts 28, 28' are rotatably supported by bearings 40 in an end plate 42 supported by the frame 22 at one end of the splicer 20. The master shaft 28 has an adjustment head 44 with a socket 46 for receiving the drive fitting of a ratchet wrench. The wrench rotates the master shaft 28 directly and the slave shaft 28 via gears to close the jaws 21 and to initiate their rapid reopening.

The heating-wand positioner includes a rod 48 that extends from a handle 50, through a hole in the end plate 42, and to a ramp that raises and lowers a heating wand into and out of contact with the butt ends of conveyor belt sections to be spliced together. The wand and the wand positioner are located midway between the left and right jaws 23, 23'. Heating control electronics for the wand is housed in an enclosure 52 at the opposite end of the splicer 20 from the wand rod's handle 50.

Figure 2:
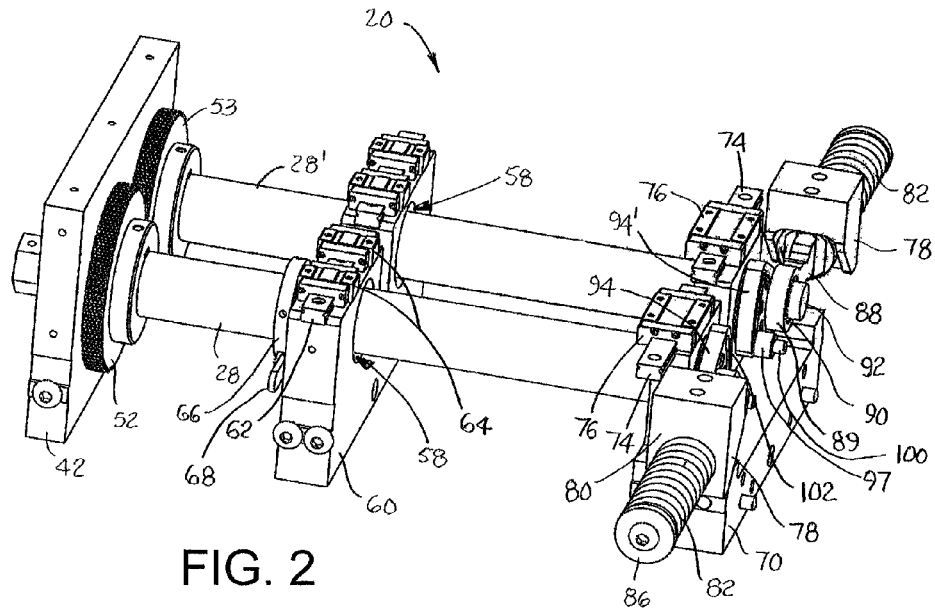
FIG. 2 is an axonometric view of the front portion of the belt splicer of FIG. 1.
Figure 3:
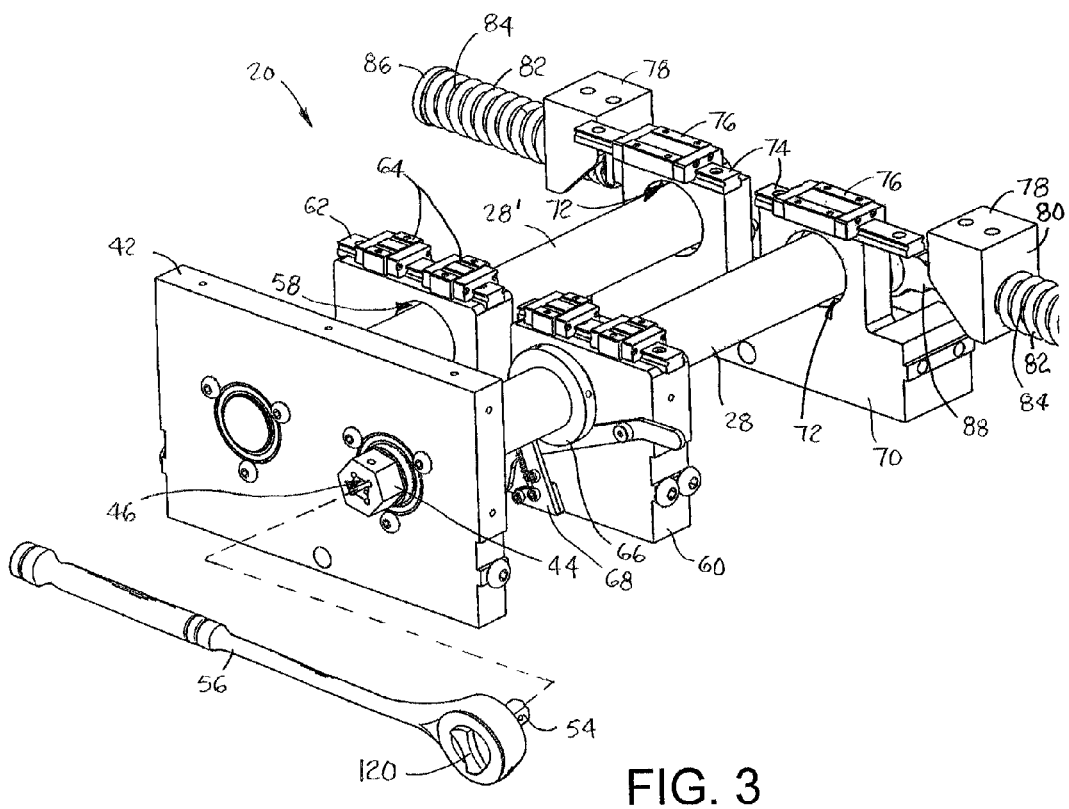
FIG. 3 is an isometric view of the front portion as in FIG. 2 taken from a different perspective.

FIGS. 2 and 3 show the adjustment end of the splicer 20 in more detail. The master shaft 28 is coupled to the slave shaft 28' by coupling means in the form of meshed gears 52, 53 at the inside of the end plate 42. Rotation of the master shaft 28 in one direction causes the slave shaft 28' to rotate in synchronism with the master shaft. The meshed gears 52, 53 shown cause the two shafts to rotate in opposite directions, but the shafts could be coupled by other coupling means, such as gears, belts, tracking servos, or otherwise, to rotate in the same direction or in opposite directions. The socket 46 in the master shaft's adjustment head 44 receives the drive fitting 54 of a ratchet 56 used to close and release the jaws 21. Both shafts 28, 28' extend in parallel through holes 58 in a front-end deck support block 60. The support block 60 has a pair of confronting linear rail guides, each comprising a rail 62 extending atop the block perpendicular to the axes of the shafts 28, 28'. Each rail guide has two carriages 64 that ride the rails 62 and support one of the left and right jaws 23, 23' (FIG. 1) at its front side. One of the shafts—in this example, the master shaft 28—has a cam ring 66 that operates to unlock a wand lock 68 and lower the heating wand (not shown in FIGS. 2 and 3). The operation of the cam 66 and the rest of the wand positioner is described in more detail later with reference to FIGS. 7-9.

Figure 4:
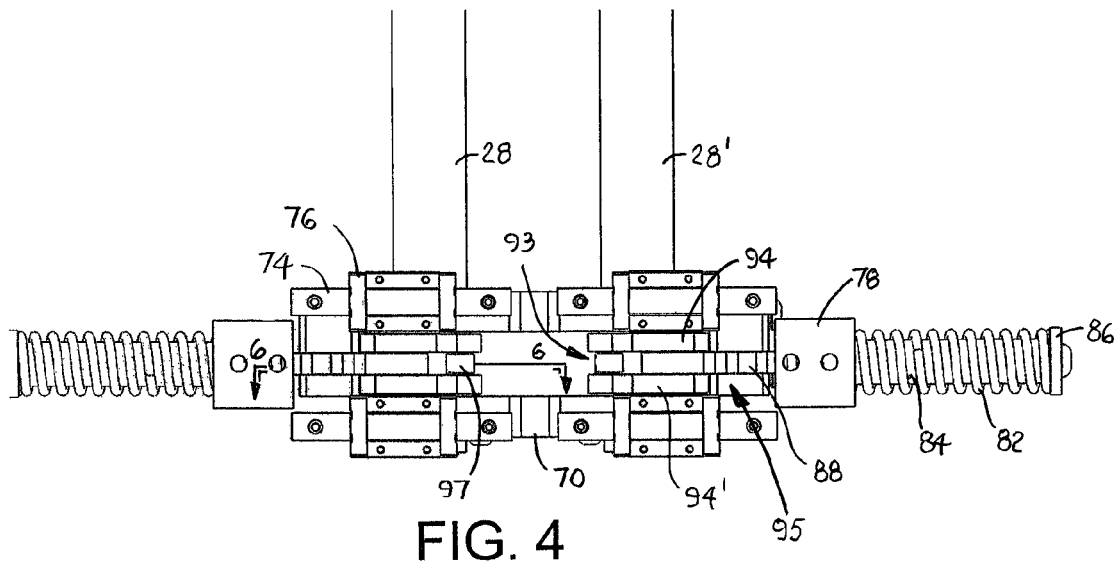
FIG. 4 is a top plan view of one of the reclosable jaw openers in the belt splicer of FIG. 1.
Figure 5:
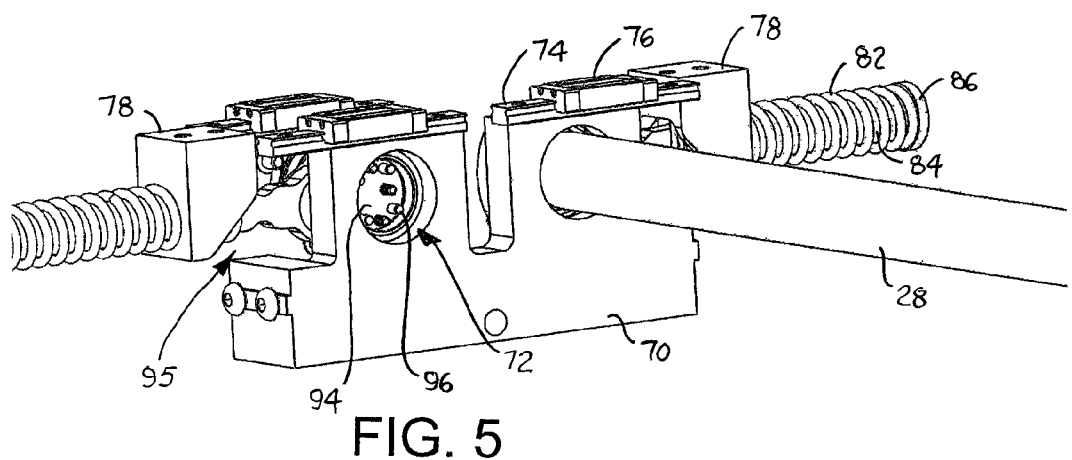
FIG. 5 is an axonometric view of the reclosable jaw opener of FIG. 4 with one of the shafts removed.

As also shown in FIGS. 4 and 5, the shafts 28, 28' extend axially beyond the front support block 60 to a jaw support block 70. Like the front support block 60, the jaw support block 70 has holes 72 through which the shafts 28, 28' pass and two pairs of linear rail guides on top. The rail guides each include a rail 74 and a carriage 76. The carriages 76 support the right and left jaws 23, 23' (FIG. 1). The two jaws 23, 23' are also fastened to spring blocks 78. The spring blocks 78 have outer faces 80 that serve as spring seats for heavy springs 82. Draw bars 84 extend outward through openings in the spring seats 80 and through the centers of the coil springs 82 to spring retainers 86. The spring seats 80, springs 82, draw bars 84, and spring retainers 86 constitute spring mechanisms 87 in the jaw openers. Connecting arms 88 are pivotally connected at outer ends to inner ends of the draw bars 84. The inner end of each connecting arm 88 has an enlarged head 89 with a bearing 90 rotatably receiving a pin 92 joining two parallel crank arms 94, 94' that act together as a crank in a crank mechanism 95 forming another part of the jaw opener. The two crank arms 94, 94' are separated by a gap 93 in which the connecting arm 88 operates. A stop roller 97 also operates in the gap 93. The roller 97 has a pair of trunnions 100, or axle stubs, that are retained in curved slots 102 in the crank arms 94, 94'. The two parallel curved slots 102 form a guide track for the stop roller 97. The shafts 28, 28' have openings (not shown) in their end faces to receive dowel pins 96 extending into the hole 72 in the jaw support block 70 from one of the crank arms 94. In this way rotation of the shafts 28, 28', acting as crank shafts, turns the crank mechanism 95. By crank action the rotary motion of the cranks 94 is converted into linear motion of the draw bars 84 via the connecting arms 88. The linear motion of the draw bars 84 inward slides the jaws 23, 23' toward each other and compresses the springs 82 against the spring blocks 78 once the jaws are prevented from closing further upon reaching positions for melting or welding. After a melting or welding operation, the compressed springs 82 are released, and their stored energy pushes the spring blocks 78 and the two jaws 23, 23' (FIG. 1) rapidly apart with an impulse of force and, consequently, acceleration. The shafts 28, 28' are not continuous, single-piece shafts. Rather, they comprise segments disposed between consecutive jaw support blocks 70 and connected at their ends to the crank arms 94, 94'.

Figure 6A:
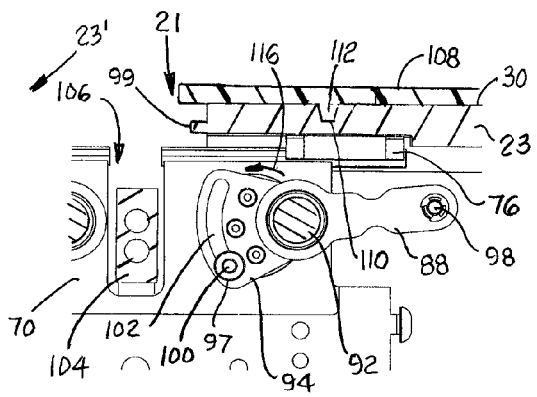
FIGS. 6A-6E are sequential cross-sectional views of the crank in the reclosable joint along lines 6-6 of FIG. 4 showing the sequential operational steps in using the splicer.

The splicing of two butt ends of belt end sections is shown in the sequence of illustrations in FIGS. 6A-6E. The butt ends 114 are clamped between the top clamps and the jaws 23, 23' in an aligned, confronting relationship on the upper decks 30 of the two jaws. Each figure represents a cross-sectional view of the splicer from the gap between the pair of crank arms of the crank. The top clamps, the spring block, and the spring are omitted from the figures to simplify the drawings. Because the operation of the two jaws 23, 23' is the same, except in opposite directions in the exemplary version, the following description of the operation of one of the jaws is sufficient for an understanding of the other's operation. In FIG. 6A the jaws 21 are open. In the open position of the jaws 21, the opposing jaws 23, 23' are separated on their carriages 76. Bi-level stops 99 protrude outward from the jaws 23, 23' toward each other at spaced apart positions along the width of the splicer. Each stop 99 has two levels of projection outward from the jaws: (a) a shallow projection (101, FIG. 6C) along a first portion of the width of the splicer; and (b) a deep projection (103, FIG. 6C) along an adjacent second portion of the width of the splicer. The shallow projection 101 on one jaw 23 is across from the deep projection 103 on the other jaw 23', and vice versa. The connecting arm 88, which is pivotally connected to the spring's draw bar (84, FIG. 4) with a pivot 98, is in an outermost position (toward the right in FIG. 6A). With the connecting arm 88 in that position, the spring is relaxed with no stored energy. The crank arm 94, which is shown as triangular- or sector-shaped, is oriented so that the joining pin 92 is also in an outermost position. The freely rotatable stop roller 97, whose trunnions 100 are retained in the curved slots 102 in the two crank arms, sits at the bottoms of the slots because of gravity. The heating wand 104 is lowered below the clamp jaw 21. A central notch 106 in the jaw support block 70 accommodates the wand 104. The end sections of a belt 108 to be spliced sit on the deck 30 of each jaw 23, 23' clamped between the jaw decks and the top clamps (not shown). A groove 110 in each deck 30 extends across the width of the deck to receive a drive bar 112 that extends across the width of the bottom of the belt section 108. The groove 110 registers the belt end for precise splicing. The belt could also be spliced bottom side up with the drive bars received in grooves formed in the bottom faces of the top clamps (32, FIG. 1).

Figure 6B:
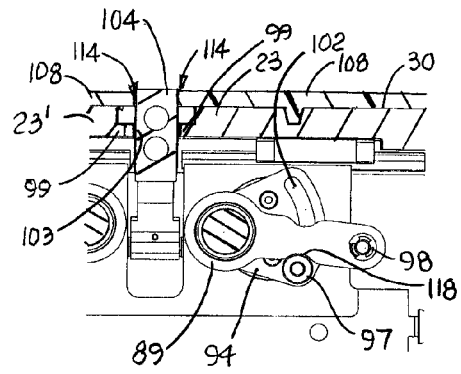

The next step in splicing is heating the butt ends 114 of the belt end sections 108 as shown in FIG. 6B. First, the heating wand 104 is raised to a position above the deck 30 between the jaws 23, 23'. Then the master and slave shafts 28, 28' are rotated manually with the ratchet 56 in FIG. 3 in a counterclockwise direction of the master shaft as indicated by arrow 116 in FIG. 6A. The head 89 of the connecting arm 88 is pulled over the top of the shaft's axis by the crank 94. The translation of the connecting arm's pivot 98 inward to an innermost position pulls the spring against the spring seat on the spring block, which draws the jaws 23, 23' toward the heating wand 104 and compresses the spring when the deep projection 103 of the bi-level stop 99 meets the side of the wand. The deep projection 103 registers the deck 30 relative to the wand 104 so that the butt end 114 is in proper contact with the side of the wand for melting. When the connecting arm's pivot 98 is at its innermost position and the spring is compressed the greatest, the crank 94 is at a critical point. Until the crank 94 reaches the critical point, the spring produces an increasing force against the rotation of the shaft 28 as the spring is compressed. Once the crank 94 is rotated just past the critical point, the spring starts to accelerate the crank and the shaft in the counterclockwise direction. Because, with the crank at the critical position, the connecting arm 88 is near the bottom end of the curved slot 102, the roller 97, positioned by gravity in the bottom of the curved slot, has only a small distance to travel in the slot before it is blocked at the end of the slot by the connecting arm 88, preventing the crank from further rotation in the clockwise direction. An indentation 118 in a side edge of the connecting arm 88 serves as a detent with the end of the slot 102 that helps lock the blocked stop roller 97 in place in the stop position. The butt ends 114 of the belt edges are squeezed against the sides of the heating wand 104 by spring pressure.

Figure 6C:
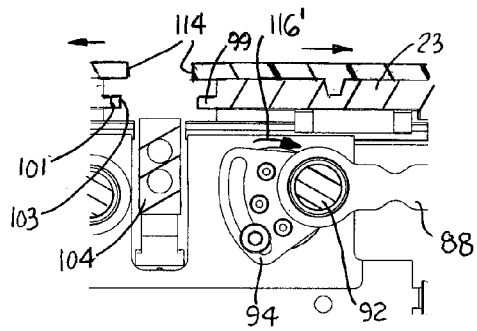

After the wand 104 heats the butt ends 114 long enough to melt them, the ratchet's ratcheting mechanism (120, FIG. 3) is reversed, and the master shaft is rotated clockwise as indicated by arrow 116' in FIG. 6C. Until the crank 94 reaches the critical point, the clockwise rotation compresses the spring slightly more. As soon as the crank 94 passes the critical point, the compressed spring is suddenly released. The energy stored in the spring is almost immediately converted into kinetic energy with an impulse of force that accelerates the jaws 23, 23' rapidly apart with an instantaneous step change in velocity to rapidly separate the melted butt ends 114 from the heating wand 104. At the same time, the wand 104 is lowered below the jaws 23, 23'. The rapid release of the spring's energy causes the master shaft to rotate at a high rate in the clockwise direction. Because the ratchet's ratcheting mechanism is set for clockwise rotation, the spring-induced rapid rotation in the same clockwise direction spins the drive fitting (54, FIG. 3) faster than the ratchet's handle (56, FIG. 3) is being turned by hand. The ratchet's pawl does not engage the ratchet's teeth and cause the handle to turn with the fitting and the master shaft. In that way the rapid release of the spring does not jerk the operator's hand. The spring, after rapidly opening the jaws 23, 23', rests in a relaxed state with the connecting arm 88 in the outermost position shown in FIG. 6C.

Figure 6D:
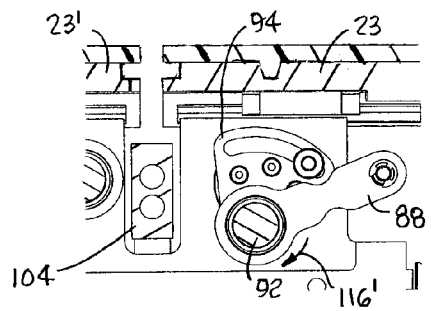
Figure 6E:
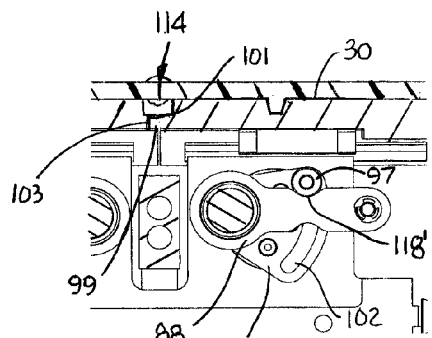

The next step in the splicing process is shown in FIG. 6D. With the heating wand 104 still lowered, the master shaft, driven by the ratchet, rotates the crank 94 in the same clockwise direction as indicated by arrow 116'. The clockwise rotation of the crank 94 draws the head 89 of the connecting arm 88 below the axis of the pivot pin 92 and toward a second locked position just above the critical point of the crank as shown in FIG. 6E. At the same time, the clockwise rotation of the crank 94 compresses the spring and closes the jaws 23, 23' until the complementary bi-level stops 99 mesh—deep projection 103 against shallow projection 101—with the melted butt ends 114 of the belt meeting as shown in FIG. 6E. The meshed bi-level stops 99 set the spacing between the opposing jaws 23, 23' for proper formation of the splice. The stop roller 97, now at the top end of the slot 102 in the crank 94, prevents further clockwise rotation of the crank and defines the second locked position against an upper detent indentation 118' on the connecting arm 88. Once the two butt ends 114 have welded together for a sufficient time, the top clamps (not shown in FIG. 6E) are unlocked and lifted so that the spliced belt can be lifted from the deck 30. The ratchet's ratcheting mechanism is then reversed, and the master shaft is rotated counterclockwise past the critical point to release the spring, which thrusts open the jaws and returns the splicer to the state shown in FIG. 6A.

Figure 7:
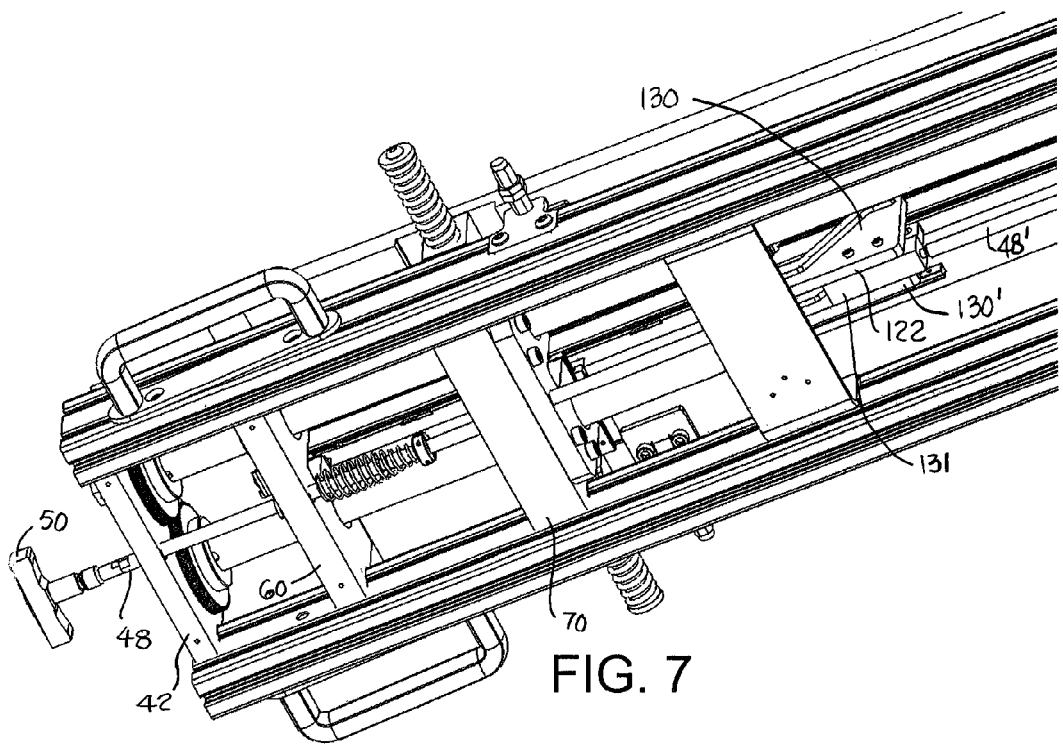
FIG. 7 is an axonometric view of the underside of the front portion of the belt splicer of FIG. 1.

FIGS. 7-9 depict the wand positioner. The adjustment rod 48 extends through holes in the bottom centers of the end plate 42, the support block 60, and the jaw support block 70 to a ramp mechanism 122. The heating wand 104 has a pair of flanges 124 on each side. Rollers 126 extend outward from the outer sides of the flanges 124 into ramped slots 128 in a pair of side walls 130, 130' forming the ramp mechanism 122. The side walls 130, 130' are mounted to opposite sides of a mounting block 131. For a wide belt splicer, a rod extension 48' extends from the block 131 to one or more other such ramp mechanisms to support and raise and lower the wand 104 at other positions along its length.

Figure 8A:
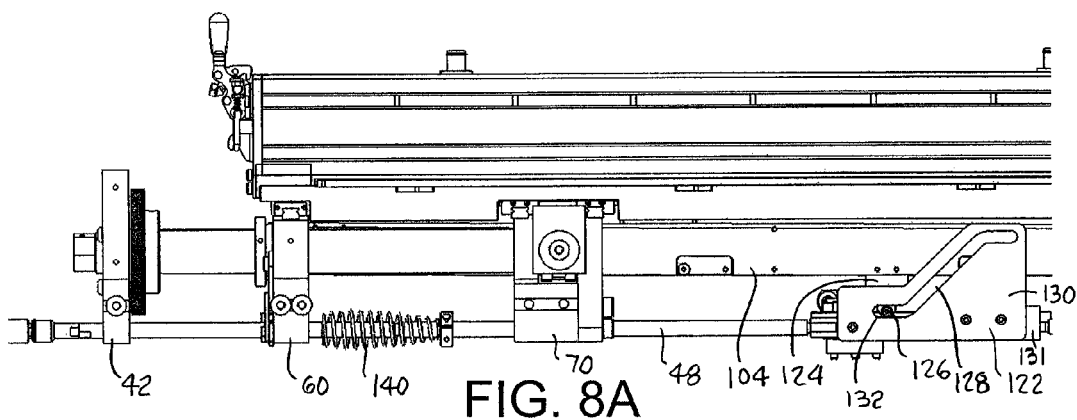
FIGS. 8A and 8B are side elevation views of the front portion of the belt splicer as in FIG. 7 showing the heating wand in retracted and operational positions.
Figure 8B:
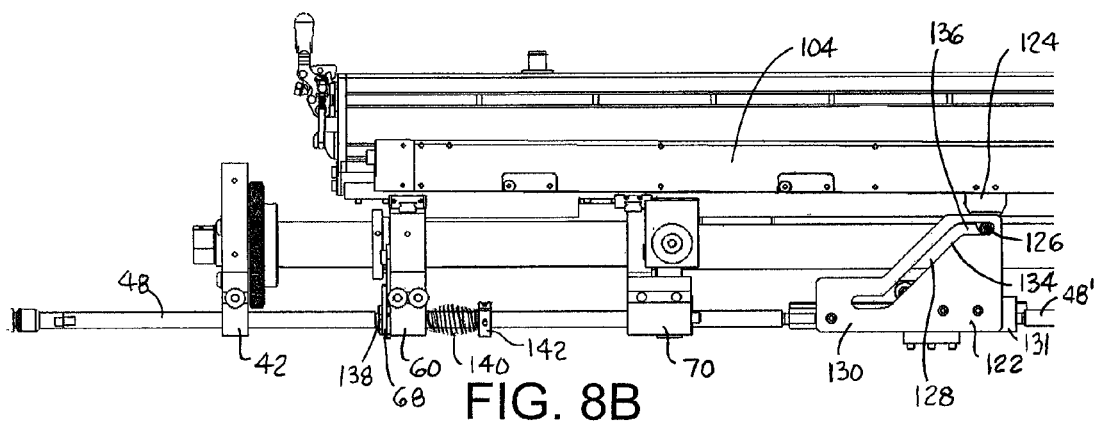

In FIG. 8A the wand 104 is shown in the lowered position in which the adjustment rod 48 is pushed forward toward the splicer's end plate 42. In the lowered position of the wand 104, the rollers 126 reside in a lower horizontal segment 132 of the ramped slot 128. When the rod 48 is pulled away from the end plate 42 as in FIG. 8B, the rollers 126 ride up a ramp segment 134 of the slot to an upper horizontal segment 136, which supports the wand 104 in the raised position for heating the butt ends of a belt. With the rod 48 retracted, a circumferential groove 138 in the rod is engaged by the wand lock 68 to lock the wand 104 in the raised position. A spring 140 is compressed between the support plate 60 and a spring ring 142 affixed to the rod 48 so that, when the wand lock 68 is unlocked, the spring pushes against the ring 142, which urges the rod from its position in FIG. 8B to its position in FIG. 8A lowering the wand 104 to its lowered position.

Figure 9A:
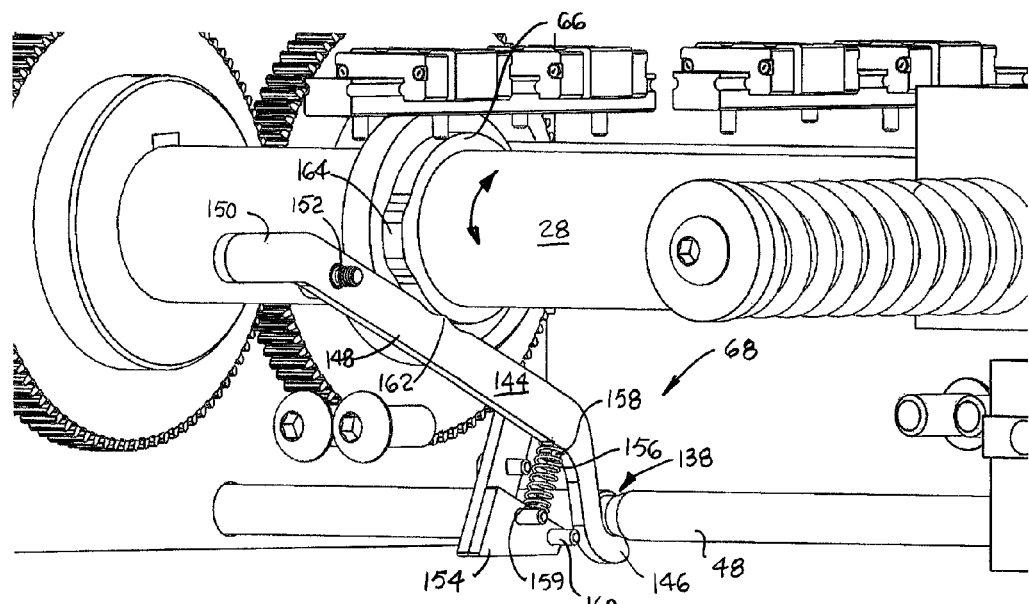
FIGS. 9A and 9B are oblique views of the wand-locking mechanism in locked and unlocked states.
Figure 9B:
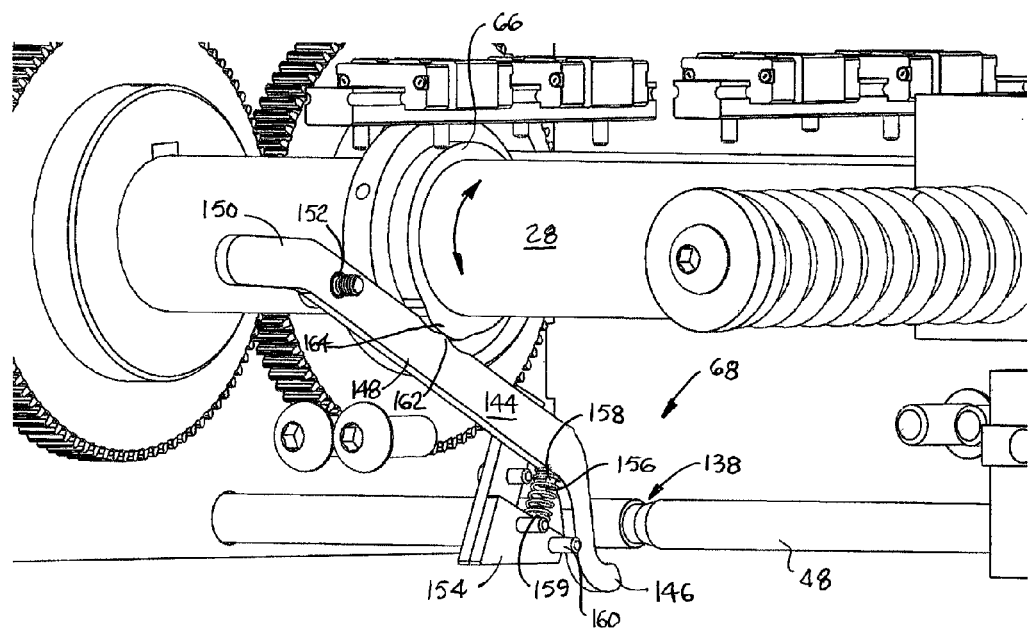

The operation and structure of the wand lock 68 is shown in more detail in FIGS. 9A and 9B with the support block (50, FIG. 7) omitted for clarity. The wand lock 68 includes a release lever 144 having a hook 146 at one end, a finger tab 150 at the other end, and an intermediate shank in between. The lever 144 is pivotally supported on a pivot pin 152 that extends from the support block to the shank 148. The wand lock 68 also includes a spring base 154 and a spring 156 between the base and the shank 148 at its lower end to bias the hook toward the wand's adjustment rod 48 so that the hook engages the groove 138 for locking. Stubs 158, 159 on the shank 148 and the spring base 154 retain the spring 156 in place. The spring base 154 is fastened to the support block (60, FIG. 7) by bolts 160 or the like. A protrusion 162 on the upper edge of the shank 148 serves as a cam follower that rides along the periphery of the cam ring 66 affixed to the master shaft 28. The wand lock 68 is shown in the locked position (wand raised) in FIG. 9A. The lever's hook end 146 is biased by the spring 156 into the circumferential groove 138 on the rod 48, locking the wand in its raised position. With the wand in the raised position, the cam ring 66 is positioned with a lobe 164 on its periphery out of contact with the lever 144. When the splicer's jaw is released, the shaft 28 turns and the cam lobe 164 encounters the cam follower 162 on the lever 144, causing the lever to pivot against the spring 156 and unhook from the wand-height adjustment rod 48. Once the rod is unlocked, the compressed rod spring 140 (FIG. 8B) pushes the rod to lower the wand 104 to the lowered position depicted in FIG. 8A.

What is claimed is:

1. A belt splicer comprising:
   a first jaw and a confronting second jaw supporting belt butt ends to be spliced together;
   a first jaw opener connected to the first jaw and a second jaw opener connected to the second jaw, each of the first and second jaws including:
   a spring mechanism connected to one of the first and second jaws and having a spring; and
   a crank mechanism having a crank coupled to the spring mechanism to compress and release the spring and to move the one of the first and second jaws toward the other of the first and second jaws;
   wherein the release of the spring thrusts the one of the first and second jaws away from the other of the first and second jaws;
   a master shaft connected to the crank mechanism of the first jaw opener to turn its crank;
   a slave shaft coupled to the master shaft to rotate together in synchronism, wherein the slave shaft is connected to the crank mechanism of the second jaw opener to turn its crank in synchronism with the crank of the first jaw opener so that the first and second jaws are closed together and so that the compressed springs of the first and second jaw openers are released simultaneously to thrust the first and second jaws open.

2. A belt splicer as in claim 1 wherein the crank mechanism further comprises a connecting arm and wherein the crank includes a pair of parallel crank arms connected across a gap by a pin pivotally connected to one end of the connecting arm whose opposite end is pivotally connected to the spring mechanism.

3. A belt splicer as in claim 2 wherein the crank arms have slots aligned across the gap and wherein the crank mechanism further includes a roller having trunnions extending from its side into the aligned slots to roll along the aligned slots to lock positions at the ends of the slots at which the roller is biased by pressure from the compressed spring against the connecting arm to block the crank.

4. A belt splicer as in claim 3 wherein the connecting arm has indentations along each side to receive the roller when the crank is in the locked position.

5. A belt splicer as in claim 1 further comprising:
   a heating wand;
   a wand positioner connected to the heating wand to raise and lower the heating wand between a raised position between the confronting first and second jaws for melting butt ends of a belt and a lowered position below the first and second jaws, wherein the wand positioner biases the heating wand toward the lowered position;
   a cam on one of the master and slave shafts; and
   a wand lock that locks the wand positioner in the raised position and that is engaged by the cam when the jaws are thrust open to unlock the wand positioner and return the heating wand to the lowered position.

6. A belt splicer as in claim 1 further comprising:
   a heating wand; and
   a ramp mechanism including a ramp along which the heating wand rides in going between a raised position between the confronting first and second jaws for melting butt ends of a belt and a lowered position below the first and second jaws.

7. A belt splicer as in claim 6 wherein the ramp mechanism further includes a rod connected to the ramp, wherein the ramp translates with the rod to raise and lower the heating wand.

8. A belt splicer as in claim 7 further comprising a wand lock engaging the rod to lock the heating wand in the raised position.

9. A belt splicer as in claim 1 comprising a plurality of first and second jaw openers disposed at spaced apart locations along the width of the splicer.

10. A belt splicer as in claim 1 further comprising a ratchet wrench rotating the master shaft to open and close the first and second jaws.

11. A belt splicer as in claim 1 wherein the slave shaft is coupled to the master shaft to rotate together in synchronism in opposite directions.

12. A belt splicer comprising:
   a first jaw and a confronting second jaw supporting belt butt ends to be spliced together;
   a first jaw opener connected to the first jaw and a second jaw opener connected to the second jaw, each of the first and second jaw openers including:
   a spring mechanism connected to one of the first and second jaws and having a spring; and
   a crank mechanism having a crank coupled to the spring mechanism to compress and release the spring and to move the one of the first and second jaws toward the other of the first and second jaws;
   wherein the release of the spring thrusts the one of the first and second jaws away from the other of the first and second jaws;
   a shaft coupled to the crank mechanisms of the first and second jaw openers to turn their cranks, the shaft having a cam;
   a heating wand; and
   a wand positioner that includes a wand lock that locks the heating wand in a raised position between the confronting first and second jaws for melting butt ends of a belt and that is engaged by the cam when the jaws are thrust open to lower the heating wand to a lowered position below the first and second jaws;
   wherein the wand positioner includes a ramp along which the heating wand rides in going between the raised position and the lowered position.

13. A belt splicer comprising:
   a first jaw and a confronting second jaw supporting belt butt ends to be spliced together;
   a first jaw opener connected to the first jaw and a second jaw opener connected to the second jaw, each of the first and second jaw openers including:
   a spring mechanism connected to one of the first and second jaws and having a spring; and a crank mechanism having a crank and a connecting arm pivotally connected at a first end to the crank and at an opposite second end to the spring mechanism to compress the spring;

wherein the crank further includes a roller and a track along which the roller rolls as the crank is rotated in a first direction to compress the spring toward a critical position at which the spring is compressed greatest;

wherein, when the crank is rotated in the first direction past the critical position, spring pressure from the compressed spring rotates the crank, which forces the roller, at an end of the track, against the connecting arm to stop the crank from further rotation in the first direction.

14. A belt splicer as in claim 13 further comprising a master shaft connected to the crank mechanism of the first jaw opener to turn its crank;

a slave shaft coupled to the master shaft to rotate together in synchronism, wherein the slave shaft is connected to the crank mechanism of the second jaw opener to turn the its crank in synchronism with the crank of the first jaw opener so that the first and second jaws are closed together and so that the compressed springs of the first and second jaw openers are released simultaneously to thrust the first and second jaws open.

15. A belt splicer as in claim 14 further comprising:

a heating wand;

a wand positioner connected to the heating wand to raise and lower the heating wand between a raised position between the confronting first and second jaws for melting butt ends of a belt and a lowered position below the first and second jaws, wherein the wand positioner biases the heating wand toward the lowered position;

a cam on one of the master and slave shafts; and a wand lock that locks the wand positioner in the raised position and that is engaged by the cam when the jaws are thrust open to unlock the wand positioner and return the heating wand to the lowered position.

16. A belt splicer as in claim 14 wherein the slave shaft is coupled to the master shaft to rotate together in synchronism in opposite directions.

* * * * *